United States Patent Office 3,488,962
Patented Jan. 13, 1970

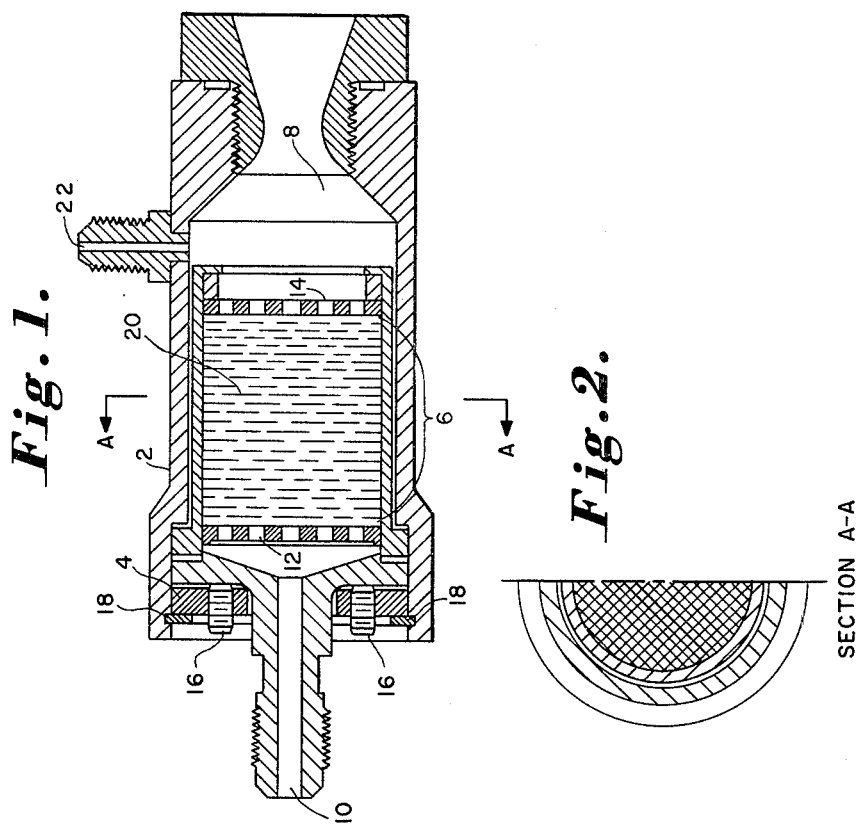

3,488,962
METHOD OF DECOMPOSING HYDROGEN PEROXIDE USING A SILVER-PALLADIUM CATALYST
James C. McCormick, West Seneca, N.Y., assignor to FMC Corporation, New York, N.Y., a corporation of Delaware
Filed July 20, 1965, Ser. No. 473,328
Int. Cl. F23r *1/02;* C06b *17/00*
U.S. Cl. 60—218  3 Claims This invention relates to an improvement in decomposition catalysts and more particularly to an improved catalyst useful in the decomposition of highly concentrated hydrogen peroxide used as a propellant.

Hydrogen peroxide is a known propellant for use in rocket engines, particularly at concentrations of 90% and above. In operation the concentrated hydrogen peroxide is passed under pressure into one end of a rocket chamber in contact with a decomposition catalyst. The catalyst accelerates decomposition of the hydrogen peroxide and the resultant gases which are exhausted from the other end of the rocket chamber provide the desired thrust. Because of the simplicity and reliability of using concentrated hydrogen peroxide as a propellant, it has been extensively used to power small rockets or thrust chambers employed in space vehicles for attitude control purposes.

In such hydrogen peroxide powered rockets the decomposition catalyst must meet certain criteria in order to satisfy the needs of attitude control rockets. One criterion is that the decomposition catalyst must decompose the hydrogen peroxide at a rate sufficient to obtain the desired thrust. Moreover, this thrust must be reasonably uniform with succeeding pulses as the rocket is activated.

Another requirement is that the time interval between activation of the rocket, i.e., the entry of the peroxide into the rocket chamber, and production of the desired thrust, which is sometimes referred to as the starting transient, must be kept below certain time periods—generally below about 100 milliseconds. ideally a system having no time delay between the entry of the peroxide into the rocket chamber and delivery of the maximum thrust is desired. A small starting transient is exceedingly important in attitude control of space vehicles because rapid response to controls are required.

A further requirement of the decomposition catalyst is that it have a rapid decay rate after the hydrogen peroxide fuel has been shut off. That is, the hydrogen peroxide decomposition rate must be sufficiently rapid that little remaining hydrogen peroxide continues to decompose for sustained periods of time after the hydrogen peroxide flow to the rocket chamber has been shut off. A rocket catalyst having a slow decay would continue to exert a thrust after being deactivated and would constantly overshoot the correct attitude control point.

Desirably, the catalyst should also have a melting point sufficiently high so that it does not melt after sustained peroxide decomposition or after numerous intermittent pulses. This problem is more acute when using higher concentrated hydrogen peroxide, on the order of about 98% than with 90% hydrogen peroxide, since higher decomposition temperatures are encountered with 98% propellant. This melting is highly undesirable because it reduces the amount of catalyst surface area which can contact the hydrogen peroxide, and lowers the overall performance of the rocket. Of the numerous metals which have been employed as decomposition catalyst silver has generally been found acceptable in satisfying most requirements. However, silver suffers the drawback of being a relatively low melting metal on the order of about 1500–1600° F. (in the presence of a high $O_2$ partial pressure generated by decomposing $H_2O_2$) and tends to melt and erode on successive firings, especially when 98% hydrogen peroxide is used.

In certain cases silver has been alloyed with other metals such as gold to form an alloy of 99% Ag and 1% Au in order to improve its performance. Such an alloy is described in U.S. Patent 3,135,703 issued on June 2, 1964. However, when silver is alloyed with other metals its catalytic properties are often adversely affected and any advantage gained with respect to the physical property of the silver alloy is offset by the loss of catalytic activity.

As a result there is a need for a decomposition catalyst for hydrogen peroxide which can be used with hydrogen peroxide having concentrations of 90% and above and which can withstand the decomposition conditions under which the peroxide is decomposed without adversely affecting its catalytic activity.

It is an object of the invention to satisfy the above need.

It is a further object of the present invention to provide a catalyst useful in space vehicle attitude rockets which is not adversely affected by the conditions obtained during rocket firing.

These and other objects will be apparent from the following disclosure.

I have found that a decomposition catalyst containing from about 20 to about 35% palladium and from about 65 to about 80% silver and coated with a discontinuous film of samarium oxide is an excellent decomposition catalyst for hydrogen peroxide and has a long catalytic life even when used to decompose hydrogen peroxide having concentrations on the order of about 98% and above. I have further found that the above catalyst has even improved physical properties if manganese is added to the above palladium-silver alloy in amount up to about 5%, without adversely affecting the catalytic decomposition properties of the above defined palladium-silver catalyst.

The combination of these two metals produces an alloy having all the desirable catalytic activity of silver but which contains none of the deficiencies of silver alone. Even greater improvements in the physical properties of the catalyst is obtained by adding a small amount on the order of about 3 to 5% of manganese to the alloy.

In carrying out the present invention an alloy containing the required amounts of palladium, silver and preferably manganese is formed into fine wires and woven into screens. The screens are then treated as set forth hereinafter to render them active and are placed in the decomposition chamber of a rocket. Hydrogen peroxide is fed into the decomposition chamber through one end of the rocket. The hydrogen peroxide decomposes violently upon contact with the decomposition screen and the decomposition gases are then ejected from the opposite end of the rocket to supply the desired thrust. The melting temperature of the catalyst is at least about 2100° F. and is well above the maximum temperature obtained in the decomposition of highly concentrated hydrogen peroxide, including 98% hydrogen peroxide.

In general, the starting transient of the decomposition catalyst, that is the time interval between entry of the peroxide into the rocket chamber and production of the desired thrust, is below about 100 milliseconds. Moreover, the decomposition catalyst also has an extremely and desirably fast decay rate. That is, the time interval between the cut off of peroxide into the rocket and the elimination of substantial thrust can be kept small, generally below 100 milliseconds.

While the decomposition catalyst described above is in the form of solid alloy, it should be understood that only the outer surface of the alloy contacts the hydrogen peroxide catalyst. Thus it is perfectly feasible and, in fact, economically desirable to make up the catalyst by placing a coating of the catalyst alloy on a high temperature base material which can resist the conditions of the decomposition catalyst. An example of a suitable base is nickel which has a melting point above 2400° F.

The coated catalyst can be made up by flame spraying the alloy onto a nickel wire. Flame spraying is accomplished by passing the alloy through a high temperature flame and depositing the melted alloy as a firmly adhered coating on the nickel wire. Thereafter, the nickel wire, coated with the catalyst alloy, can be woven into a screen, activated as set forth hereinafter, and placed in the decomposition chamber of a rocket. The flame spraying technique is desirable because it yields a firmly adhered layer of catalytic alloy to a nickel base. However, other known techniques may be used to coat the catalyst alloy on nickel base screens. For example, the alloy can be deposited by vapor deposition or by dipping the nickel in a molten bath of the metal alloy.

The catalyst screen, whether made from solid wires of the catalyst alloy or from a nickel base coated with the alloy, must be activated before being used in the rocket. The activation comprises, first treating the screen in a manner to roughen the surface of the individual wires. This is done, preferably, by sand blasting the screen although other means can be used. Thereafter, the screen is dipped in nitric acid, preferably having a concentration of 20% to 70% by weight. The nitric acid treatment dissolves a trace of the metal alloy. During this dip, it is most important that the nitric acid contact all of the abraded surfaces of the decomposition alloy. Thereafter the screen is removed from the nitric acid and the wetted screen is heated at temperatures of at least 500° F., but below the melting point of the screen until it is perfectly dry. The screen is then dipped in a 2 to 20% by weight aqueous samarium nitrate solution and then heated to at least about 900° F. for at least about 5 minutes. This procedure is repeated until a discontinuous film of samarium oxide is formed on the surface of the screen. Thereafter the screen is cooled and placed in the catalytic chamber for use.

The samarium oxide discontinuous film is used on the catalyst to prevent large gas bubbles generated during decomposition of the peroxide from adhering to the surface of the catalyst. The samarium oxide film appears to prevent large gas bubbles from being evolved and building up into pockets surrounding the catalyst. These gas pockets are most undesired since they prevent free access of the peroxide to the catalyst metal and thus decrease the effectiveness of the catalyst.

The invention will now be illustrated by reference to the drawings. In the drawings:

FIG. 1 is a longitudinal sectional view of a rocket equipped with a catalyst bed constructed in accordance with the present invention.

FIG. 2 is a sectional view through the rocket.

In FIG. 1 the rocket chamber 2 includes a mounting flange 4, a catalyst pack 6 and exhaust port 8. The hydrogen peroxide enters inlet port 10 and strikes a dispersion plate 12 where it is distributed uniformly throughout the cross section of the catalytic pack 6. The hydrogen peroxide then enters the catalytic pack 6 where it is decomposed by catalyst 20 and the evolved gases escape through a perforated plate 14 which performs the dual function of retaining the catalytic bed in place while permitting the decomposition gases to escape through exhaust port 8. The gases leaving the exhaust port provide the thrust to the entire rocket. In general, the hydrogen peroxide is fed into inlet port 10 under high pressure sufficient to prevent any decomposition gases from backing up into inlet port 10. In rocket chamber 2 the catalytic alloy, in the form of wires woven into screens, is placed in stacks. These stacks of wire mesh disks constitute the catalytic pack 6 and can be removed from the chamber after its life has been exhausted by removing retaining screws 16 which hold both mounting flange 4 and retaining ring 18 in a locked position in the rocket chamber. Retaining ring 18 must first be removed before mounting flange 4 can be withdrawn from the head of the rocket. An exhaust orifice 22 is shown connected to exhaust port 8 for measuring the pressure that builds up in exhaust port 8. The difference in pressure between inlet port 10 and exhaust port 8 indicates the reaction efficiencies of the catalyst under identical testing conditions.

The following examples are given to illustrate the present invention and are not deemed to be limiting thereof.

EXAMPLE 1

A series of one-inch diameter screens, 20 x 20 inches made up of .014 inch diameter pure nickel wire were annealed by heating them in a furnace to a temperature of 1400° F. and then allowing them to cool in the deactivated furnace overnight. The wire screens were then flame sprayed with an alloy of 70% by weight silver and 30% by weight palladium. The flame spraying was accomplished by feeding the alloy in wire form (.057 inch in diameter) into an oxygen-acetylene flame and depositing the melted alloy onto the wire screens until a uniform coating was obtained. The alloy coatings were found on an average to be about .003 inch thick. The screens were activated by sand blasting them to roughen the surface of the wires, dipping them in a 70% $HNO_3$ solution and heating the screens to about 500° F. The screens, after cooling, were dipped into a 10% by weight samarium nitrate-water solution and then heated at 1000° F. for 5 minutes. This was repeated five times until a discontinuous film of samarium oxide was formed on the wires. The screens were assembled into a catalytic pack and placed in the catalytic chamber of a rocket constructed as set forth in FIG. 1. The rocket was then mounted on a stand, and a source of 98% hydrogen peroxide was connected through a flexible hose to the inlet port of the rocket. A solenoid valve in the hose controlled the flow of peroxide into the rocket. The hydrogen peroxide was fed into the rocket at 350 p.s.i. and the pressures developed in the exhaust port 8 during the pulse firings were recorded over the period of the pulse. The thrust of the rocket was also recorded. The test procedure was as follows:

(a) three 200 millisecond pulses, within 3 second interval between pulses;
(b) 10 minute delay, followed by two 150 millisecond pulses per second for 300 seconds;
(c) allow motor to cool, and repeat step (a);
(d) two 150 millisecond pulses per second for 6 seconds;
(e) repeat steps (c) and (d).

During step (a) the second pulse gave a total pressure in the exhaust port of 184 p.s.i.g. and 90% of this pressure was developed in 90 milliseconds. The total thrust was 29.9 lbs. After the peroxide flow was stopped 80% of the exhaust port pressure developed was lost after 60 milliseconds, indicating an 80% decay in 60 milliseconds.

During step (a) the third pulse gave a total exhaust port pressure of 214 p.s.i.g., and 90% of the pressure was developed in 68 milliseconds. The 80% decay time was 42 milliseconds.

Thereafter, the succeeding pulses gave a total exhaust port pressure of 225 p.s.i.g., and 90% of the pressure was developed in 40 milliseconds. The 80% decay time was 30 milliseconds. The thrust of the rocket continued at about 30 lbs. The specific impulse (pound seconds of thrust per pound of propellant) was 149 seconds.

EXAMPLE 2

The test procedure of Example 1 was repeated with a second catalyst alloy, 75% silver, 20% palladium and 5% manganese (all percents are by weight). In this test the 98% $H_2O_2$ was fed into the rocket at a pressure of 350 p.s.i.

The pulses in steps (b) to (e) gave a total pressure in the exhaust port of 262 p.s.i. and 90% of this pressure was developed in 64 milliseconds. The 80% decay time was 42 seconds and the total thrust of the rocket was 31.6 lbs. The specific impulse (pound seconds of thrust per pound of propellant) was 144 seconds.

EXAMPLE 3

Example 1 was repeated with catalyst screens, 20 x 20 mesh made up of 0.14 inch wires fabricated from an alloy containing 70% by weight silver and 30% by weight palladium, and activated as set forth in Example 1. The results were substantially the same as those obtained in Example 1.

While the catalyst bed of the present invention is intended principally for use in rockets or thrust chambers it should be appreciated that the present invention is equally applicable to any unit in which hydrogen peroxide must be decomposed quickly, for example, a gas generator, turbo-pump drive or as an oxidant in bipropellent rockets or engines.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. In the method of producing thrust by contacting hydrogen peroxide with a decomposition catalyst and exhausting the resulting gases to produce thrust, the improvement comprising using a catalyst comprising a metal alloy made up of 65% to 80% by weight of silver and 20% to 35% by weight of palladium, said alloy having a discontinuous film of samarium oxide thereon.

2. In the method of producing thrust by contacting hydrogen peroxide with a decomposition catalyst and exhausting the resulting gases to produce thrust, the improvement comprising using a catalyst comprising a metal alloy made up of 65% to 80% by weight of silver, 20% to 35% by weight of palladium and up to 5% by weight of manganese, said alloy having a discontinuous film of samarium oxide thereon.

3. In the method of producing thrust by contacting hydrogen peroxide with a decomposition catalyst and exhausting the resulting gases to produce thrust, the improvement comprising using a catalyst comprising a porous nickel metal coated with an alloy made up of 65% to 80% by weight of silver and 20% to 35% by weight of palladium, said alloy having a discontinuous film of samarium oxide thereon.

References Cited

UNITED STATES PATENTS

| | | | |
|---|---|---|---|
| 2,004,141 | 6/1935 | Tilley et al. | 252—474 X |
| 2,802,889 | 8/1957 | Frevel et al. | 252—474 X |
| 2,838,462 | 6/1958 | Pease | 252—474 X |
| 2,927,141 | 3/1960 | Cohn et al. | 252—474 X |
| 3,135,703 | 6/1964 | Sill | 252—474 |
| 3,212,255 | 10/1965 | Putt et al. | 252—474 X |

CARL D. QUARFORTH, Primary Examiner

S. J. LECHERT, Assistant Examiner

U.S. Cl. X.R.

60—219; 252—462, 471, 474